(12) United States Patent  (10) Patent No.: US 6,744,627 B2
Won et al.  (45) Date of Patent: Jun. 1, 2004

(54) NOTEBOOK COMPUTER AND DOCKING STATION HAVING ANTI-THEFT LOCK (75) Inventors: Burn-young Won, Suwon (KR); Hyun-soo Kim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/166,096

(22) Filed: Jun. 11, 2002

(65) Prior Publication Data

US 2003/0128506 A1 Jul. 10, 2003

(30) Foreign Application Priority Data

Jan. 8, 2002 (KR) .......................... 2002-1011

(51) Int. Cl.⁷ .............................. H01R 13/62
(52) U.S. Cl. ................. 361/686; 361/683; 439/155; 439/135
(58) Field of Search ............... 361/683, 686, 361/724–727, 681; 312/223.11, 223.2; 364/708.1; 439/135–147, 153, 159; 70/14, 57, 58, 32–34; 248/552, 553; 395/281–283; 710/102

(56) References Cited

U.S. PATENT DOCUMENTS

| 5,692,400 | A |   | 12/1997 | Bliven et al. |         |
|-----------|---|---|---------|---------------|---------|
| 5,790,375 | A |   | 8/1998  | Lee           |         |
| 5,870,283 | A | * | 2/1999  | Maeda et al.  | 361/686 |
| 6,093,039 | A | * | 7/2000  | Lord          | 439/155 |
| 6,135,801 | A | * | 10/2000 | Helot et al.  | 439/341 |
| 6,275,378 | B1| * | 8/2001  | Lee et al.    | 361/686 |
| 6,280,212 | B1|   | 8/2001  | Nguyen et al. |         |
| 6,331,934 | B1| * | 12/2001 | Helot et al.  | 361/686 |
| 6,570,758 | B1| * | 5/2003  | Maeda         | 361/686 |

FOREIGN PATENT DOCUMENTS

| JP | 10-198459    | 7/1998  |
| JP | 2000-099203  | 4/2000  |
| JP | 2000-137542  | 5/2000  |
| JP | 2001-290556  | 10/2001 |
| KR | 1997-0066794 | 10/1997 |
| KR | 1999-0019945 | 6/1999  |

* cited by examiner

Primary Examiner—Michael Datskovsky
(74) Attorney, Agent, or Firm—Staas & Halsey, LLP (57) ABSTRACT A notebook computer having a computer main body and a docking station detachably installed to a lower part of the computer main body, cooperating with the computer main body, the notebook computer includes a KENSINGTON lock having a lock member that extends through a lock hole part provided in the docking station. A link is slidably installed in the docking station to lock and release the lock member. A lock part is provided in the docking station to allow the docking station to be coupled to or released from the lower part of the computer main body. A rotation-limiting part is provided between the link and the lock part to limit the rotation of the lock part when the link is locked to the lock member of the KENSINGTON lock according to the sliding movement of the link.

37 Claims, 7 Drawing Sheets

NOTEBOOK COMPUTER AND DOCKING STATION HAVING ANTI-THEFT LOCK

CROSS-REFERENCE TO RELATED APPLICATION

This application claims the benefit of Korean Application No. 2002-1011, filed Jan. 8, 2002, in the Korean Intellectual Property Office, the disclosure of which is incorporated herein by reference.

BACKGROUND OF THE INVENTION

1. Field of the Invention

The present invention relates in general to notebook computers, and more particularly, to a notebook computer in which a computer body and a docking station can be locked together using a lock.

2. Description of the Related Art

Recently, users prefer notebook computers whose bodies are slim. Coping with such user preference, notebook computers whose main bodies can be connected with docking stations have recently become popular.

The docking station generally includes a hardware frame and a series of interfaces that provide electrical connections with external devices. Using the docking station, functions of a notebook computer can be executed effectively like a desktop computer. These interfaces typically allow the notebook computer to communicate with a local printer, large-capacity storage devices or backup drives and other devices, which are separately provided to a notebook computer. A docking station may further include a network interface card (NIC) with which the notebook computer is allowed to access a local area network (LAN). Variations of the docking station include a port extending device, a device that extends the number of ports which can be used in a notebook computer, and a storage expanding device holding therein a CD-ROM drive, a floppy disk drive, and additional storage units.

The docking station also includes a lock hole through which a KENSINGTON lock is locked to prevent the loss or theft of the docking station. The KENSINGTON Lock generally refers to a plastic-coated steel cable with a lock. One end is fixed at an opening on one side of the notebook with a special key and locked. The other end is attached to a fixed point. Without the appropriate key, you cannot remove the notebook computer without damaging it.

However, in the conventional notebook computer, whose main body is connected with the docking station, a locking function is not provided to the computer main body connected to the docking station when the docking station is fastened with the KENSINGTON lock. Thus, the computer main body may be lost or stolen.

In order to prevent both the computer main body and the docking station from being stolen, a plurality of KENSINGTON locks must be installed separately to the computer body and the docking station, thereby causing trouble or inconvenience to the users.

SUMMARY OF THE INVENTION

The present invention has been made keeping in mind the above and other shortcomings, and an object of the present invention is to provide a notebook computer in which a computer body and a docking station can be locked with a lock to thereby prevent the computer main body and the docking station from being lost or stolen.

Additional objects and advantages of the invention will be set forth in part in the description which follows and, in part, will be obvious from the description, or may be learned by practice of the invention.

This and other objects of the present invention may be achieved by providing a notebook computer having a computer main body and a docking station detachably installed to a lower part of the computer main body, and cooperating with the computer main body according to an embodiment of the invention, comprising a lock having a lock member, a lock hole part provided in the docking station through which the lock member of the lock is inserted, a link slidably installed in the docking station to lock and release the lock member of the lock, a lock part provided in the docking station to allow the docking station to be coupled to or released from the lower part of the computer main body, and a rotation-limiting part provided between the link and the lock part to limit a limiting rotation of the lock part when the link is locked to the lock member of the lock according to the sliding movement of the link.

According to an aspect of the invention, the link further comprises a spring to elastically bias the link so as to allow the link to be locked to the lock member of the lock.

According to an aspect of the invention, the rotation-limiting part comprises a rib extended from one side of the link toward the lock part, thereby being in contact with or separated from the lock part according to the sliding movement of the link.

According to yet another aspect of the invention, the rotation-limiting part further comprises a rotation arm having a first wing rotatably combined in the docking station and being in contact with a side of the link, and a second wing in contact with or separated from the lock part according to the sliding movement of the link.

BRIEF DESCRIPTION OF THE DRAWINGS

The present invention will be better understood and its various objects and advantages will be more fully appreciated from the following description taken in conjunction with the accompanying drawings, in which.

DETAILED DESCRIPTION OF THE EMBODIMENTS

Hereinbelow, the present invention will be described in more detail with reference to the accompanying drawings, wherein like reference numerals refer to the like elements throughout. The embodiments are described below in order to explain the present invention by referring to the figures.

Figure 1:
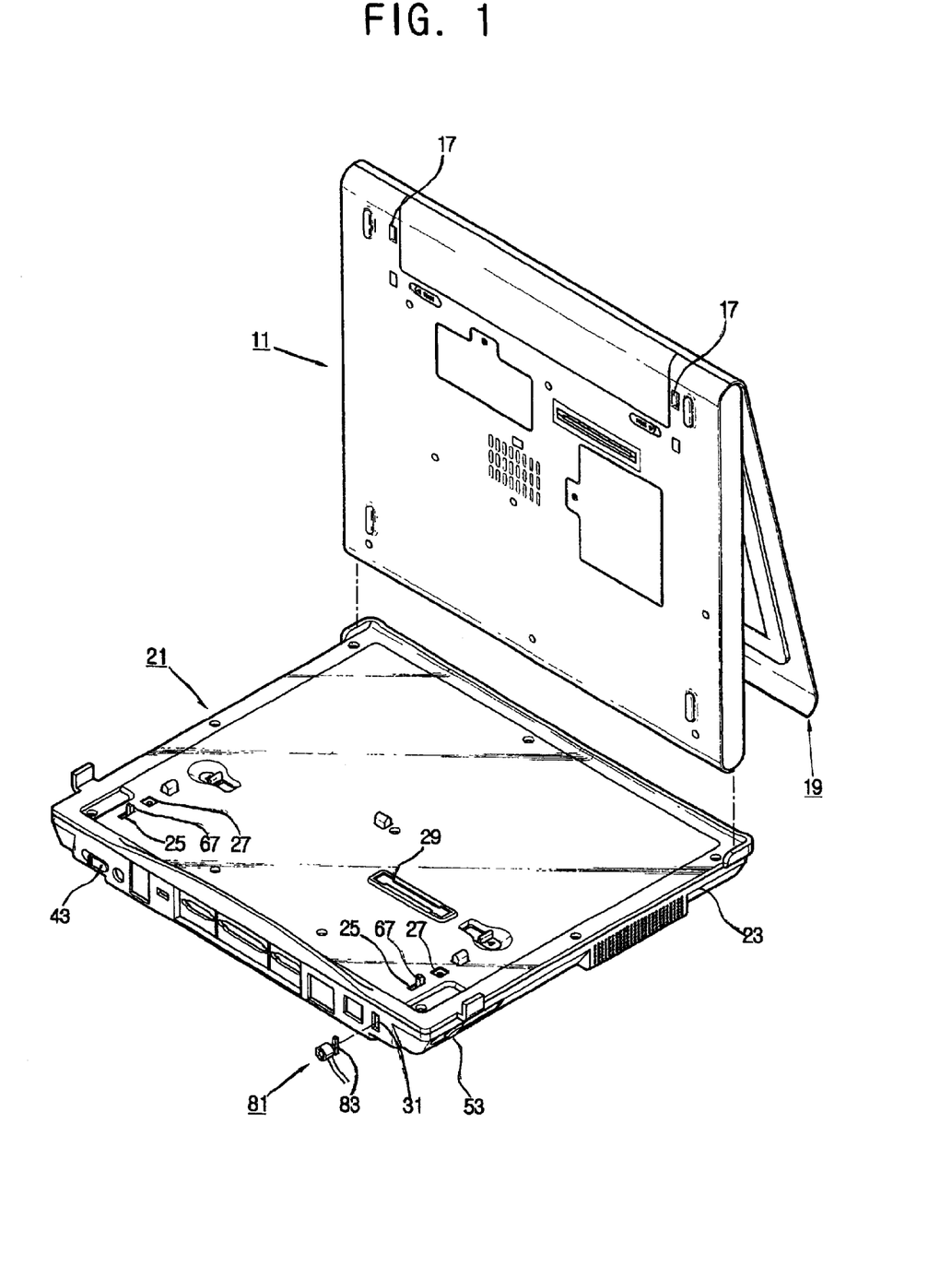
FIG. 1 is a perspective view of a computer main body and a docking station of a notebook computer according to an embodiment of the present invention.
Figure 2:
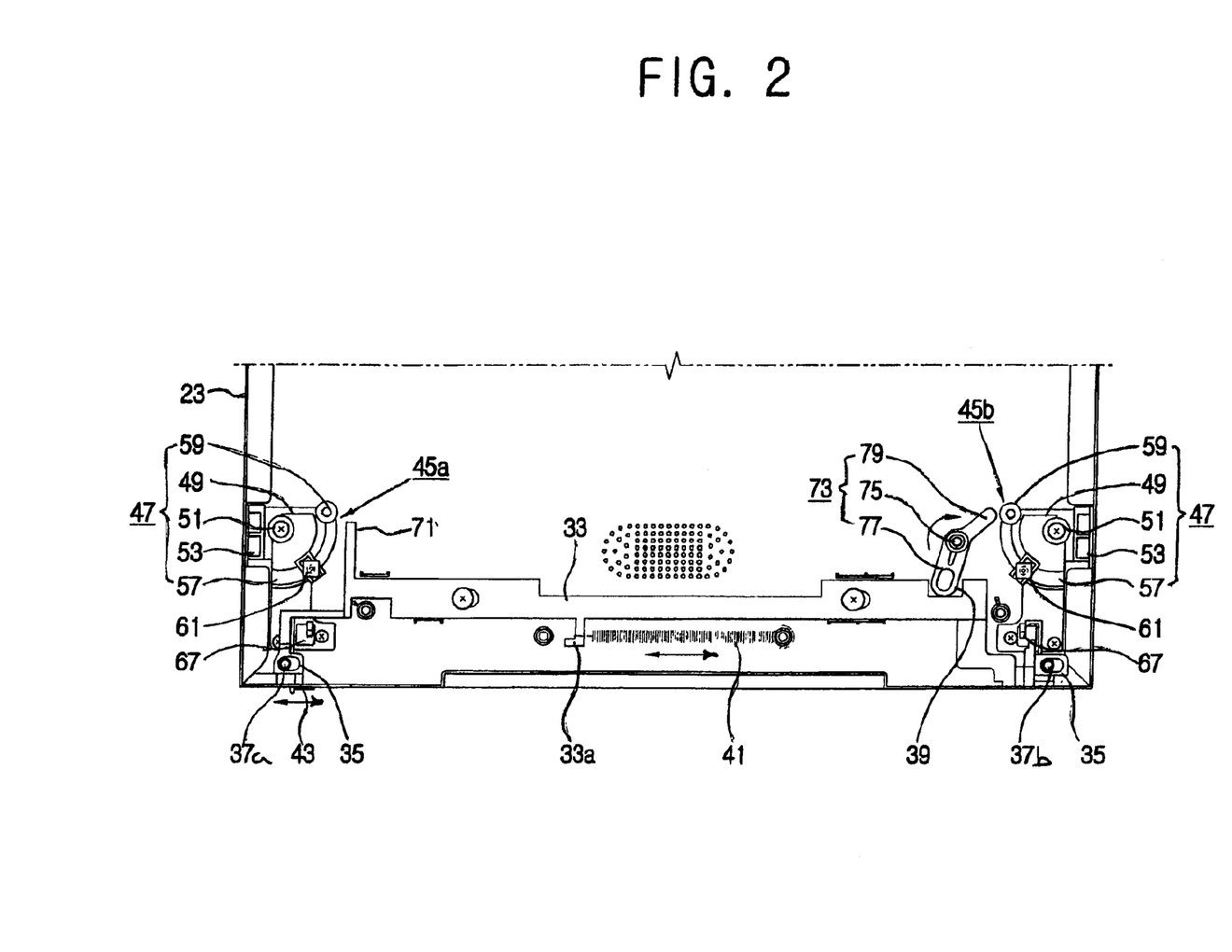
FIG. 2 is a top plan partial view showing an inner part of the docking station according to the embodiment of the present invention shown in FIG. 1.
Figure 3:
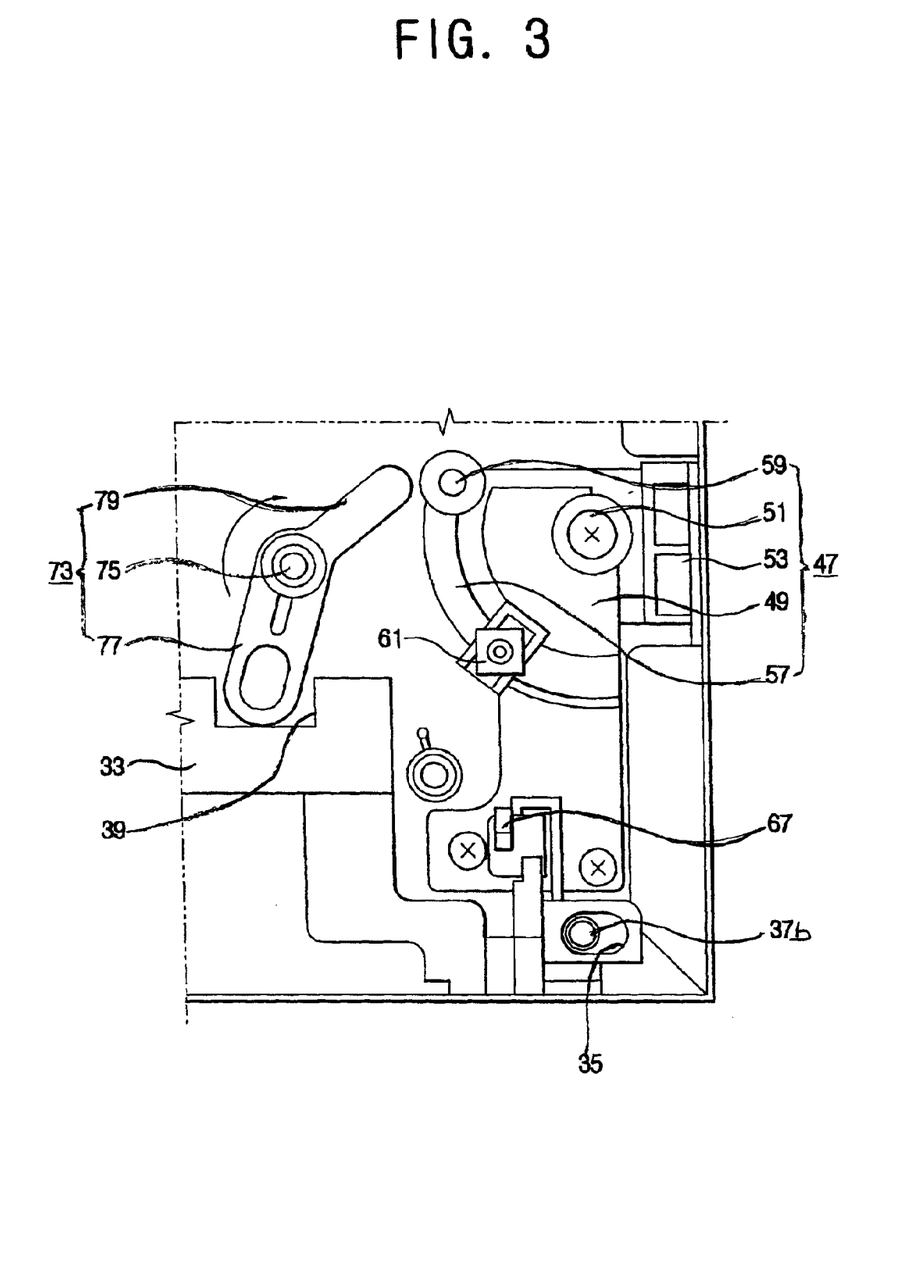
FIG. 3 is an enlarged view showing a main portion of FIG. 2.

FIG. 1 is a perspective view of a computer main body 11 and a docking station 21 of a notebook computer according to an embodiment of the present invention, FIG. 2 is a top plan view showing partially an inner part of the docking station 21 according to the present invention and FIG. 3 is an enlarged view showing a main portion of FIG. 2. As illustrated therein, a notebook computer according to the present invention includes the computer main body 11 equipped with a central processing unit (CPU), a display unit 19 to receive a picture signal generated from the computer main body 11 and to display the picture. The docking station 21 is detachably installed on a lower part of the computer main body 11 and cooperates with the computer main body 11. A lock 81 includes a lock member 83 and a cable 85 (shown in FIG. 6). According to an embodiment of the invention, the lock 81 is a KENSINGTON lock, but can be any lock suitable to secure the docking station 21.

The computer main body 11 includes a keyboard part and a touch pad (not shown), which are mechanisms that transmit an input signal into the computer main body 11. A pair of hook grooves 17 are formed on corresponding opposite sides of the bottom of the computer main body 11. The hook grooves 17 allow hooks 67 of holder units 63 (see FIGS. 4A and 4B) to be inserted thereinto or released therefrom as will be described below.

The docking station 21 includes a lock hole 31 allowing a lock member 83 of the lock 81 to be inserted or released. An embodiment of a transmission member includes a link 33 locks or releases the lock member 83 of the lock 81. First and second lock parts 45a, 45b allow the docking station 21 to be coupled to or released from a bottom face of the computer main body 11. Embodiments of a rotation limiting part include a rib 71 and a rotation arm 73, which are respectively formed between opposite end parts of the link 33 and the first and second lock parts 45, 45b to limit a rotation of the first and second lock parts 45a, 45b when the link 33 fastens the lock member 83 of the lock 81 according to a sliding movement of the link 33.

An external appearance of the docking station 21 is defined by a casing 23, which is shown with a rectangular box shape according to an embodiment of the invention. A pair of hook-passing holes 25 are formed on corresponding opposite sides of a top plate of the casing 23. The hooks 67 of the holder parts 63 pass through the holes 25. Each of a pair of lift-passing holes 27 is formed adjacent a corresponding one of the hook-passing holes 25. Lifts 61 of the first and second lock parts 45a, 45b pass through corresponding holes 27. An interface part 29 is also provided on the top plate of the casing 23. The interface part 29 receives and transmits data between the docking station 21 and the computer main body 11. The open lock hole 31 is formed on a front side of the casing 23 according to an embodiment of the invention.

The link 33 is slidably installed so as to slide along the directions indicated by an arrow in FIG. 2. On opposite end parts of the link 33 are formed a pair of elongated grooves 35 having a predetermined length. Each of a pair of stopper pins 37a, 37b is received in a corresponding elongated groove 35 to prevent the link 33 from detaching from the lower plate of the casing 23. The stopper pins 37a, 37b also limit the sliding movement of the link 33. The stopper pin 37b, which is positioned on one side of the link 33 (the right side of FIG. 2) to which the lock member 83 of the lock 81 is installed, also closely fastens and secures the lock member 83 of the lock 81.

The link 33 includes a wing-receiving groove 39 to receive an end part of a first wing 77 of the rotation arm 73 to be described below. Using the groove 39, the rotation arm 73 is rotated in response to the sliding movement of the link 33. One end part of a spring 41 is coupled to a spring-coupling part 33a near the center of the link 33. This spring 41 restores the link 33 to its original position or allows the lock member 83 of the lock 81 to be fastened. One end part of the link 33 (the left side of FIG. 2) is coupled to a knob 43, which allows a user to slide the link 33. The knob 43 protrudes from a front of the casing 23 opposite to the lock hole 31.

The first and second lock parts 45a, 45b allow the docking station to be coupled to or released from the bottom face of the computer main body 11 and are provided in both inner sides of the docking station 21. The first lock part 45a allows the docking station 21 to be coupled to or released from a left bottom face of the computer main body 11. The second lock part 45b allows the docking station 21 to be coupled to or released from a right bottom face of the computer main body 11.

Each of the lock parts 45a, 45b includes a rotator part 47 that is rotatably coupled to the bottom face of the computer main body. A lift part 61 of the lock parts 45a, 45b is lifted up or down in response to the rotation of the rotator part 47 so as to be coupled to or released from the bottom face of the computer main body 11. A holder part 63 is (see FIGS. 4A and 4B) coupled to or released from the bottom face of the computer main body 11. The holder part 63 is advanced or retracted in response to the rotation of the rotator part 47 so as to engage the corresponding groove 17 of the computer main body 11.

As shown in FIGS. 2 to 4B, the rotator part 47 has a rotating plate 49 of an approximate quarter circle shape on which a cam 58 is partially formed. The rotating part 47 is rotatably coupled to the bottom face of the casing 23 by a rotation shaft 51. One side of the rotating plate 49 is coupled to a lever 53 that protrudes from a side of the casing 23. While not shown, a twist coil spring is provided on the bottom of the rotating plate 49. The elasticity of the twist coil spring is applied in a direction opposite to a rotation direction of the lever 53. The rotation direction of the lever 53 is the direction that the lever 53 moves to detach the docking station 21 from the computer main body 11. However, the twist coil spring is not required in all aspects of the invention.

An arc-shaped guide 57 is provided near the outer circumference of the rotating plate 49, spaced from the outer circumference of the rotating plate 49 by a predetermined distance. One end part of the guide 57 and one end part of the rotating plate 49 are interconnected by a connecting pin 59. The guide 57 has an upwardly inclined face that is inclined opposite to the rotation direction of the lever 53 to detach the docking station 21 from the computer main body 11.

The lift part 61 is bar-shaped and is closely coupled to the inclined face of the guide 57. The lift part 61 slides along the inclined face of the guide 57 according to the rotation of the rotator part 47. Due to the sliding movement, the lift part 61 moves up and down vertically.

The holder part 63 includes a bar-shaped rod 65 that is advanced or retracted. The holder part 63 is closely coupled to the outer circumference of the cam 58 of the rotating plate 49. A hook 67 is at an end of the rod 65. According to an embodiment of the invention, the hook 67 is a bent end of the rod 65. The hook 67 is detachably coupled to the hook groove 17 on the rear face of the computer main body 11. On the outer circumference of the rod 65 is provided an auxiliary spring 69 to elastically bias the rod 65 to be restored to its original, retracted, position.

Figure 4A:
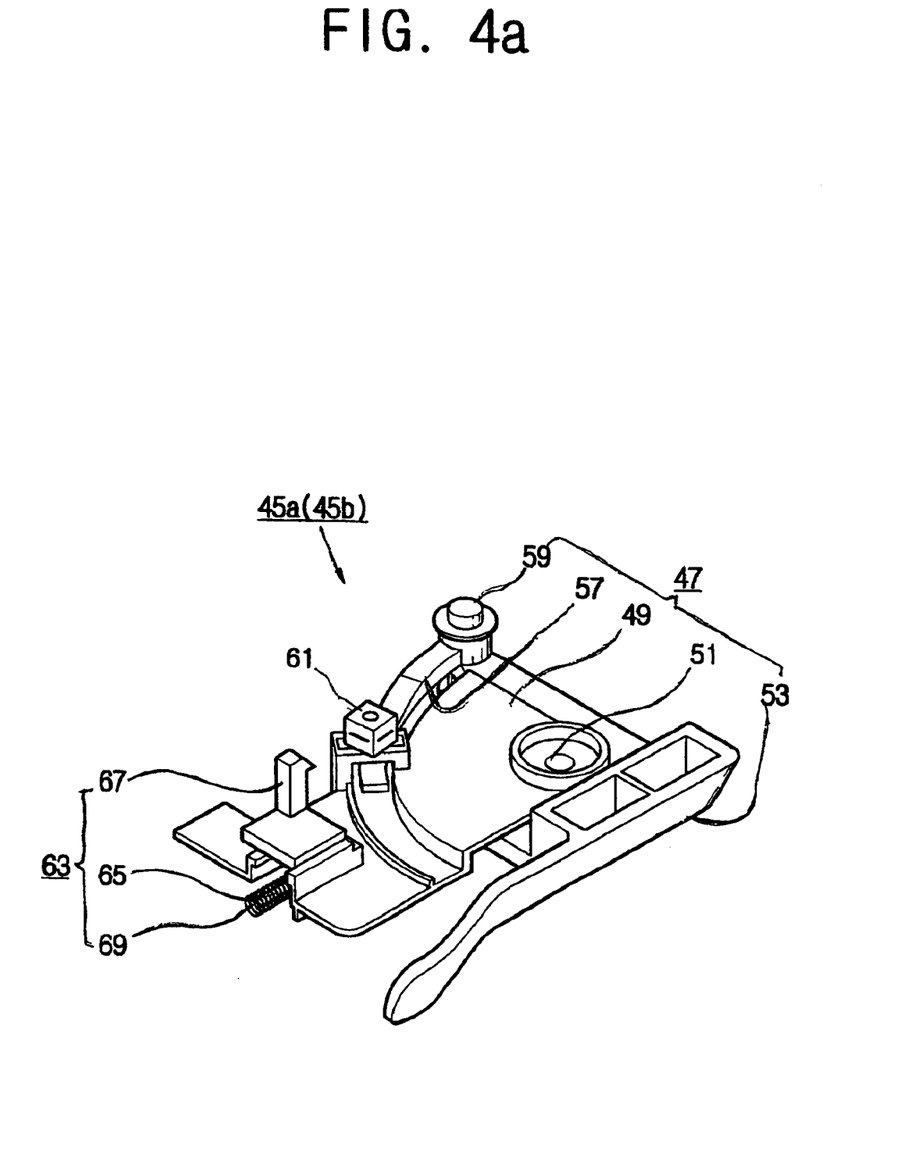
FIGS. 4A and 4B are views showing a configuration and an operation state of the lock part of FIG. 2.
Figure 4B:
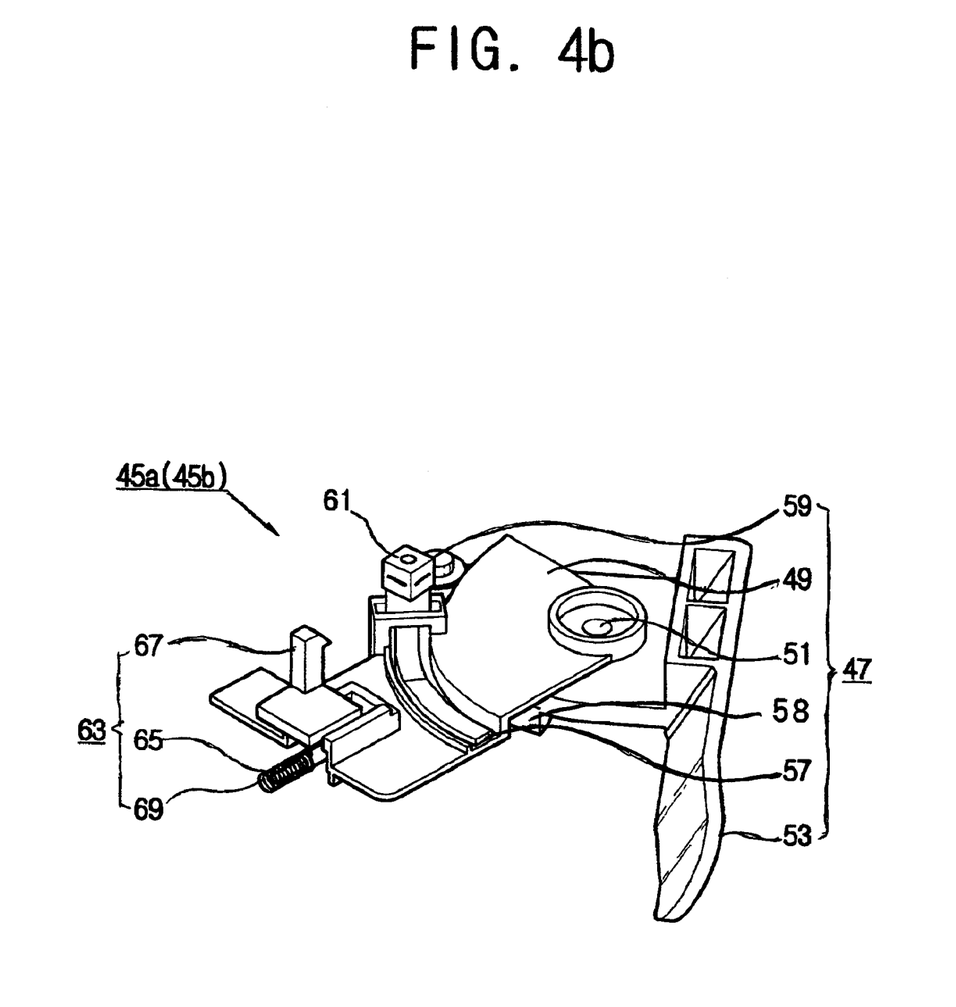

FIGS. 4A and 4B are views showing the configuration and the operation of the lock parts 45a, 45b of FIG. 2. Specifically, FIG. 4A shows a state before the rotator part 47 of the lock parts 45a, 45b is rotated, and FIG. 4B shows a state after the rotator part 47 of the lock parts 45a, 45b is rotated. As illustrated therein, if the lever 53 of the rotator part 47 is rotated counterclockwise, the rotating plate 49 and the guide 57 are rotated counterclockwise. The counterclockwise rotation lifts the lift part 61 upward as the lift part 61 slides along the inclined face of the guide 57. The lift part 61 is thereby pressed up against the bottom face of the computer body 11. The pressing action of the lift part 61 allows the computer main body 11 to be more easily detached from the docking station 21. However, it is understood that the lift part 61 need not be used in all instances.

At the same time, the cam 58 of the rotating plate 49 presses the rod 65 of the holder part 63 so as to allow the rod 65 of the holder part 63 to be advanced. The movement of the rod 65 moves the hook 67 so as to be detached from the hook groove 17 of the computer main body 11.

Conversely, if the lever 53 of the rotator part 47 is rotated clockwise to be restored to its original position, the rotating plate 49 and the guide 57 are rotated clockwise. The lift part 61 is moved downward along the inclined face of the guide 57, thereby separating the lift part 61 from the lower face of the computer main body 11. The movement of the rotating plate 49 also presses the rod 65 of the holder part 63 so as to be released. As the rod 65 is subsequently retracted to its original position by the elasticity of the auxiliary spring 69 of the holder part 63, the hook 67 is also retracted. When the hook 67 is retracted, it becomes coupled to the hook groove 17 of the computer main body 11.

The docking station 21 also includes the rib 71 and the rotation arm 73, which limit the rotation of the lock parts 45a, 45b. The rib 71 extends from the link 33 by a predetermined length toward the rotator part 47 of the first lock part 45a transversely to a lengthwise direction of the link 33 from a first side of the link 33 (the left side of FIG. 2). The rib 71 is in contact with or separated from an outer circumference of the rotating plate 49 of the first lock part 45a in response to the sliding movement of the link 33.

The rotation arm 73 is rotatably coupled to the lower plate of the casing 23 by the rotation arm shaft 75. The rotation arm 73 has the first wing 77 and a second wing part 79. The first wing part 77 is received in the wing-receiving groove 39 of the link 33 and the second wing 79 is in contact with or separated from an outer circumference of the second lock part 45b according to the sliding movement of the link 33. The first wing 77 and the second wing 79 form a predetermined angle relative to each other.

The lock member 83 of the lock 81 has a rectangular shape having a short side and a long side. The lock member 83 is detachably connected to the link 33. The lock member 83 is rotated by a key (not shown), whereby the long side or the short side of the lock member 83 is positioned between the link 33 and the stopper pin 37. The rotation of the lock member 83 locks or unlocks the computer main body 11 to or from the docking station 21.

Although it has not been shown, it is understood that a rear of the docking station 21 includes installed peripheral devices generally used with docking stations 21. These devices include, but are not limited to a CD-ROM drive and a floppy disk drive. Similarly, openings are in the rear plate of the casing 23 through which CDs and floppy disks are inserted.

Figure 5:
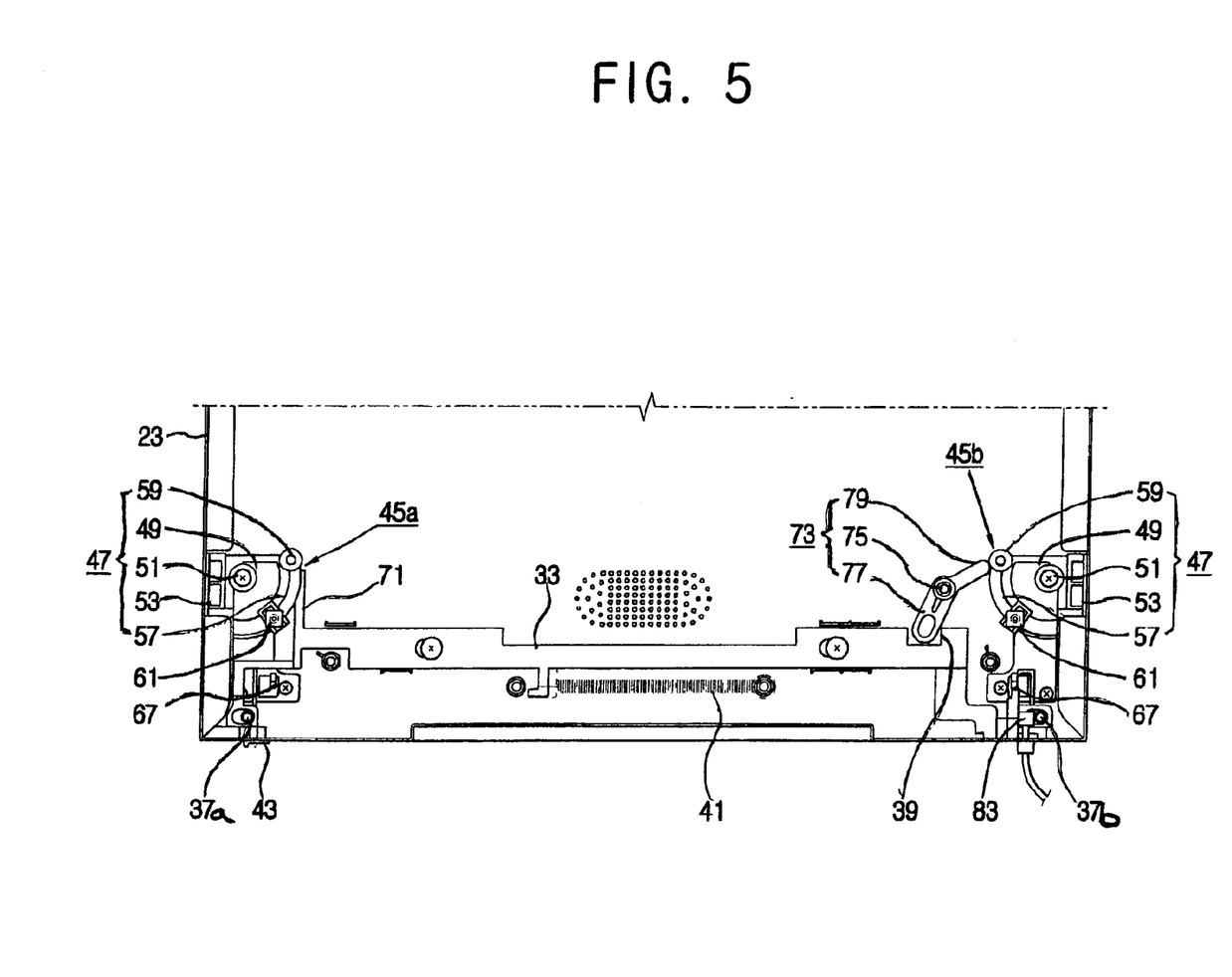
FIG. 5 is a top plan view showing partially an inner part of the docking station, illustrating the locking state of the docking station.

With this configuration, the locking and releasing of the computer main body 11 and the docking station 21 according to an embodiment of the present invention will be described as follows. The hook 67 of the holder part 63 provided in the docking station 21 is coupled to the hook groove 17 in the lower face of the computer main body 11. As shown in FIG. 5, the lock hole 31 is opened by pushing the knob 43 of the docking station 21 to the left (i.e., in the locking direction). The lock member 83 of the lock 81 is then inserted through the lock hole 31 so as to be installed in contact with the link 33. The lock member 83 is rotated by a key (not shown), which positions the long side of the lock member 83 between the link 33 and the stopper pin 37. Thus, the lock member 83 is locked to the docking station 21.

The link 33 is moved to the left by the width of the long side of the lock member 83. Due to the bias of the spring 41, the lock member 83 is secured between the link 33 and the stopper pin 37. The movement of the link 33 to the left by the lock member 83 places the rib 71 of the link 33 in contact with the outer circumference of the rotating plate 49 of the first lock part 45a. The first wing part 77 of the rotation arm 73, which is received in the wing-receiving groove 39 of the link 33, is rotated clockwise with the predetermined angle due to the movement of the link 33. The second wing part 79 contacts with the outer circumference of the rotating plate 49 of the second lock part 45b. Thus, while the lock member 83 is in the lock position, even if the levers 53 of the lock parts 45a, 45b are rotated backward in order to release the computer main body 11 from the docking station 21, the rotations of the rotator parts 47 of the lock parts 45a, 45b are limited by the rib 71, the rotation arm 73, and the link 33. Accordingly, the lift parts 61 and the hooks 67 do not work, and the computer main body 11 remains integrally connected to the docking station 21.

Next, a process of releasing/unlocking the computer main body 11 from the docking station will be described as follows. The lock member 83 of the lock 81 is rotated by a key (not shown), which positions the short side of the lock member 83 between the link 33 and the stopper pin 37. The lock member 83 is thereby detachable from the docking station 21 through the lock hole 31. When the lock member 83 is detachable, the link 33 is moved to the right by the elasticity of the spring 41 as shown in FIG. 2. The movement of the link 33 is limited by the stopper pins 37a, 37b received in the elongated grooves 35 provided in the link 33.

At the same time, the rib 71 is also moved to the right by the predetermined distance, which allows the rib 71 to separate from the outer circumference of the rotating plate 49 of the first lock part 45a. Also, the movement of the link 33 rotates the first wing 77 of the rotation arm 73 counterclockwise with the predetermined angle according to movement of the link 33. The second wing part 79 is separated from the outer circumference of the rotating plate 49 of the second lock part 45b. Thus, if the levers 53 of the lock parts 45a, 45b are rotated backward so as to release the computer main body 11 from the docking station 21, each rotator part 47 is not bound by the rib 71 or the rotation arm 73.

Accordingly, the rod 65 of the holder part 63 is advanced to the front according to the rotation of each rotator part 47. The movement of the rod 65 advances the hooks 67 to the front, which separates the hooks 67 from the hook grooves 17 of the computer main body 11. The lift parts 61 slide along the upward inclined face of the guide 57 of the rotator parts 47 while the hooks 67 are advanced according to rotation of the rotator parts 47. The lift parts 61 are thereby lifted to press the lower surface of the computer main body 11. Therefore, the computer main body 11 and the docking station 21 are separated from each other.

Figure 6:
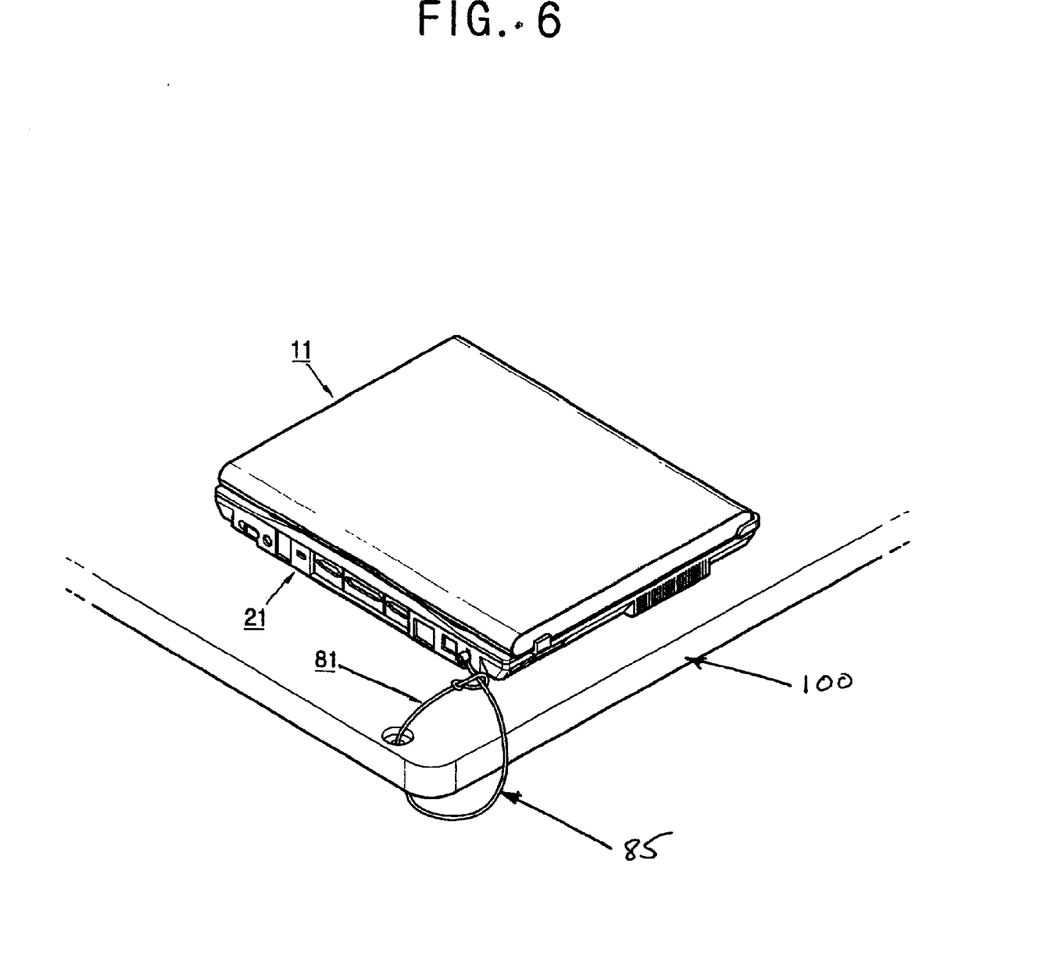
FIG. 6 is a view showing a state which the computer main body is fastened to a table by a KENSINGTON lock, by way of example.

FIG. 6 shows the state that the main body of the notebook computer and the docking station according to the present invention are locked to a desk 100 by the lock 81. The shown example is a KENSINGTON lock, but it is understood that other types of locks could be used.

As disclosed herein, a rotation-limiting part is provided between the link and the lock part that limits a rotation of the lock part when the link is locked using the lock member of the inserted lock. The rotation of the lock part is limited according to the sliding movement of the link, thereby allowing the computer main body and the docking station to be detachably coupled to each other and simultaneously preventing them from being stolen or lost.

As described above, according to the present invention there is provided a notebook computer capable of locking the computer main body and the docking station with a lock and also preventing them from being lost or stolen.

While not shown, it is understood that the shapes and locations of the casing, holes, and the link can be varied according to a type of the notebook computer and the docking station.

Although the preferred embodiments of the present invention have been disclosed for illustrative purposes, those skilled in the art will appreciate that various modifications, additions and substitutions are possible, without departing from the scope and spirit of the invention as disclosed in the accompanying claims and equivalents thereof.

What is claimed is:

1. A locking system for use with a notebook computer having a computer main body, comprising:
   a lock having a lock member;
   a docking station detachably installed to a lower part of the computer main, said docking station including a lock hole through which the lock member is inserted;
   a link slidably installed in said docking station to move between a lock position and a release position according to a lock and a release state of the lock member;
   a lock part provided in said docking station to allow said docking station to be coupled to or released from the lower part of the computer main body according to the lock state and the release state of the lock member; and
   a rotation-limiting part provided between said link and said lock part to limit a rotation of said lock part when said link is locked to the lock member and which moves according to a sliding movement of said link between the lock position and the release position.

2. The locking system according to claim 1, wherein said link further comprises a spring to elastically bias said link to the lock position be locked to the lock member.

3. The locking system according to claim 1, wherein said rotation-limiting part comprises a rib extended from one side of said link toward said lock part in order to be in contact with or separated from said lock part according to the sliding movement of said link.

4. The locking system according to claim 1, wherein:
   said rotation-limiting part further comprises a rotation arm comprising a first wing and a second wing that are rotatably combined in said docking station,
   the first wing is in contact with one side of said link, and
   the second wing is in contact with or separated from said lock part according to the sliding movement of said link.

5. The locking system according to claim 2, wherein said rotation-limiting part comprises a rib extended from one side of said link toward said lock part in order to be in contact with or separated from said lock part according to the sliding movement of said link.

6. The locking system according to claim 2, wherein:
   said rotation-limiting part further comprises a rotation arm comprising a first wing and a second wing that are rotatably combined in said docking station,
   the first wing is in contact with one side of said link, and
   the second wing is in contact with or separated from said lock part according to the sliding movement of said link.

7. A docking station for use with a detachable computer and an external lock, comprising:
   a casing including a docking side to receive the computer and a lock hole to receive the external lock while the computer is attached to said casing;
   a transmission member in said casing and comprising a link member to slide along one of a length and a width of the casing between a lock position and a release position, the transmission member having a first end and a second end opposite the first end, where the first end is positioned according to a lock state or a release state of the external lock when inserted through the lock hole and to the lock position and the release position of the link member; and
   a locking member that extends through said casing to lock or release the received computer according to a movement of the second end in response to the position of the first end.

8. A docking station for use with a detachable computer and an external lock, comprising:
   a casing including a docking side to receive the computer and a lock hole to receive the external lock while the computer is attached to said casing;
   a transmission member in said casing having a first end and a second end, where the first end is positioned according to a lock state or a release state of the external lock when inserted through the lock hole; and
   a locking member that extends through said casing to lock or release the received computer according to a movement of the second end in response to the position of the first end,
   wherein said locking member comprises a locking part that is inserted into a groove of the received computer, and when the second end is moved due to the lock state of the external lock, the locking part engages a side of the groove so as to prevent the computer from being detached while the external lock is in the lock state.

9. The docking station according to claim 8, wherein the locking part comprises a locking hook that hooks the side of the groove when the external lock is in the lock state.

10. The docking station according to claim 7, further comprising an ejection member that is engaged with said transmission member, wherein said ejection member is responsive to the movement of the second end and detaches the received computer from said casing when the external lock is in the release state, the link member is in the release position, and said locking member releases the received computer.

11. The docking station according to claim 10, further comprising a rotation member rotatably attached to said casing and slideably in contact with said ejection member, said rotation member having a lever extending external to said casing, wherein, when the external lock is in the release state, the movement of the lever rotates said rotation member to slideably move said ejection member so as to push the computer away from said casing.

12. The docking station according to claim 8, further comprising a rotation member rotatably attached to said casing and slideably in contact with the locking part, said rotation member having a lever extending external to said casing, wherein, when the external lock is in the release state, the movement of the lever rotates said rotation member to slideably move said locking member to disengage from the side of the groove of the computer.

13. The docking station according to claim 12, wherein:
said transmission member further comprises a rotation limiting unit,
the rotation limiting unit engages with said rotation member to prevent said rotation member from disengaging the locking part when the external lock is in the lock state; and
the rotation limiting unit disengages said rotation member to allow said rotation member to disengage the locking part when the external lock is in the release state.

14. The docking station according to claim 13, further comprising an ejection member that is engaged with said transmission member, wherein:
said rotation member is further slideably in contact with said ejection member,
when the external lock is in the release state, the movement of the lever rotates said rotation member to slideably move said ejection member so as to push the computer away from said casing, and
when the external lock is in the lock state, the rotation limiting unit prevents said rotation member from rotating so as to prevent said ejection member from being slideably moved so as to push the computer away from said casing.

15. The docking station according to claim 13, wherein the rotation limiting unit comprises a prong that does not move relative to said transmission member and limits the rotation of said rotation member due to the movement of the second end of said transmission member.

16. The docking station according to claim 13, wherein the rotation limiting unit is rotationally connected to said casing, wherein the movement of the second end of said transmission member rotates the rotation limiting unit to limit the rotation of said rotation member.

17. The docking station according to claim 7, wherein:
said transmission member comprises an opening into which an element of the external lock is inserted while in the locking state, and
the first end of said transmission member remains at a locking position while the element of the external lock is inserted into the opening, and moves to a release position when the element of the external lock is removed from the opening.

18. The docking station according to claim 14, wherein:
said transmission member comprises an opening into which an element of the external lock is inserted while in the locking state, and
the first end of said transmission member remains at a locking position while the element of the external lock is inserted into the opening, and moves to a release position when the element of the external lock is removed from the opening.

19. The docking station according to claim 18, wherein the rotation limiting unit does not move relative to said transmission member and limits the rotation of said rotation member due to the movement of the second end of said transmission member.

20. The docking station according to claim 18, wherein the rotation limiting unit is rotationally connected to said casing, wherein the movement of the second end of said transmission unit rotates the rotation limiting unit to limit the rotation of said rotation member.

21. A computer station for use with an external lock, comprising:
a computer comprising a central processing unit and a computer casing, the computer casing including a lock receiving part; and
a docking station to which said computer is detachably mated, said docking station comprising:
a dock casing including a docking side to receive the computer casing and a lock hole to receive the external lock while said computer is mated to said docking station,
a transmission member in the dock casing having a link member which slides along one of a length and a width of the dock casing between a lock position and a release position and having a first end and a second end, where the first end is positioned according to a lock state or a release state of the external lock when inserted through the lock hole and according to the lock position and the release position of the link member, and
a locking member that extends through the dock casing to be received in the lock receiving part and which locks or releases said computer according to a movement of the second end in response to the position of the first end.

22. A computer station for use with an external lock, comprising:
a computer comprising a central processing unit and a computer casing, the computer casing including a lock receiving part; and
a docking station to which said computer is detachably mated, said docking station comprising:
a dock casing including a docking side to receive the computer casing and a lock hole to receive the external lock while said computer is mated to said docking station,
a transmission member in the dock casing having a first end and a second end, where the first end is positioned according to a lock state or a release state of the external lock when inserted through the lock hole, and
a locking member that extends through the dock casing to be received in the lock receiving part and which locks or releases said computer according to a movement of the second end in response to the position of the first end,
wherein:
the lock receiving part comprises a groove,
the locking member comprises a locking part that is inserted into the groove, and
when the second end is moved due to the lock state of the external lock, the locking part engages a side of the groove so as to prevent said computer from being detached from said docking station while the external lock is in the lock state.

23. The computer station according to claim 22, wherein the locking part comprises a locking hook that hooks the side of the groove when the external lock is in the lock state.

24. The computer station according to claim 21, wherein:
said docking station further comprises an ejection member that is engaged with the transmission member, and the ejection member is responsive to the movement of the second end and detaches said computer from the dock casing when the external lock is in the release state, the link member is in the release position, and the locking member releases said computer.

25. The computer station according to claim 24, wherein:

said docking station further comprises a rotation member rotatably attached to the dock casing and slideably in contact with the ejection member, the rotation member comprises a lever extending external to the dock casing, and when the external lock is in the release state, the movement of the lever rotates the rotation member to slideably move the ejection member so as press against the computer casing so as to push said computer away from the dock casing.

26. The computer station according to claim 22, wherein:

said docking station further comprises a rotation member rotatably attached to the dock casing and slideably in contact with the locking part, the rotation member comprises a lever extending external to the dock casing, and when the external lock is in the release state, the movement of the lever rotates the rotation member to slideably move the locking member to disengage from the side of the groove of said computer.

27. The computer station according to claim 26, wherein:

the transmission member further comprises a rotation limiting unit, the rotation limiting unit engages with the rotation member to prevent the rotation member from disengaging the locking part when the external lock is in the lock state; and the rotation limiting unit disengages the rotation member to allow the rotation member to disengage the locking part when the external lock is in the release state.

28. The computer station according to claim 27, wherein:

said docking station further comprises an ejection member that is engaged with the transmission member, the rotation member is further slideably in contact with the ejection member, when the external lock is in the release state, the movement of the lever rotates the rotation member to slideably move the ejection member to press against the computer casing so as to push said computer away from the dock casing, and when the external lock is in the lock state, the rotation limiting unit prevents the rotation member from rotating so as to prevent the ejection member from being slideably moved so as to push said computer away from the dock casing.

29. The computer station according to claim 27, wherein the rotation limiting unit comprises a prong that does not move relative to the transmission member and limits the rotation of the rotation member due to the movement of the second end of said transmission member.

30. The computer station according to claim 27, wherein the rotation limiting unit is rotationally connected to the dock casing, wherein the movement of the second end of the transmission member rotates the rotation limiting unit to limit the rotation of the rotation member.

31. The computer station according to claim 21, wherein:

the transmission member comprises an opening into which an element of the external lock is inserted while in the locking state, and the first end of the transmission member remains at a locking position while the element of the external lock is inserted into the opening, and moves to a release position when the element of the external lock is removed from the opening.

32. The computer station according to claim 22, wherein:

the transmission member comprises an opening into which an element of the external lock is inserted while in the locking state, and the first end of the transmission member remains at a locking position while the element of the external lock is inserted into the opening, and moves to a release position when the element of the external lock is removed from the opening.

33. The computer station according to claim 28, wherein said docking station further comprises an interface through which data is received or transmitted from said computer.

34. The computer station according to claim 33, wherein said computer comprises a portable computer.

35. The computer station according to claim 34, wherein said computer further comprises a display rotatably attached to the computer casing.

36. The locking system according to claim 3, further comprising a rotation arm comprising a first wing and a second wing that are rotatably combined in said docking station, wherein:

the first wing is in contact with another side of said link, and the second wing is in contact with or separated from said lock part according to the sliding movement of said link.

37. The locking system according to claim 5, further comprising a rotation arm comprising a first wing and a second wing that are rotatably combined in said docking station, wherein:

the first wing is in contact with another side of said link, and the second wing is in contact with or separated from said lock part according to the sliding movement of said link.

* * * * *

UNITED STATES PATENT AND TRADEMARK OFFICE
CERTIFICATE OF CORRECTION

PATENT NO. : 6,744,627 B2
DATED : June 1, 2004
INVENTOR(S) : Bum-young Won et al.

It is certified that error appears in the above-identified patent and that said Letters Patent is hereby corrected as shown below:

Title page,
Item [75], Inventors, change "Burn-young Won" to -- Bum-young Won --
Item [57], ABSTRACT,
Line 4, change "," to -- . --
Line 4, change "the" to -- The --.

Signed and Sealed this

Seventh Day of December, 2004

JON W. DUDAS
*Director of the United States Patent and Trademark Office*